United States Patent [19]
Hung et al.

[11] Patent Number: 5,991,054
[45] Date of Patent: Nov. 23, 1999

[54] WINDOW MANAGEMENT OF A SCANNING MACHINE

[75] Inventors: Hsien-Che Hung; Hsin-Hung Tu, both of Hsinchu, Taiwan

[73] Assignee: Mustek Systems Inc., Hsinchu, Taiwan

[21] Appl. No.: 08/886,966

[22] Filed: Jul. 2, 1997

[51] Int. Cl.[6] .................................................. H04N 1/04
[52] U.S. Cl. ............................................ 358/474; 358/494
[58] Field of Search ................................ 358/474, 482, 358/483, 486, 487, 491, 493, 494, 496, 471, 473, 479; 382/312, 313

[56] References Cited

U.S. PATENT DOCUMENTS 5,005,329  4/1991  Schorr ........................................ 52/204
5,065,842  11/1991  Nahar ........................................ 186/61
5,803,622  9/1998  Mama ........................................ 399/4

Primary Examiner—Jerome Grant II
Attorney, Agent, or Firm—W. Wayne Liauh

[57] ABSTRACT

A window arrangement including a scanning area in a scanner through which document is moved and scanned; a window mounted in the scanning area through which scanning light passes onto document to be scanned; a locating device adapted to hold the window in the scanning area; and a pick-up device fastened to one end of the window through which the window can be pulled away from the locating device out of the scanning area for a maintenance work.

4 Claims, 5 Drawing Sheets

WINDOW MANAGEMENT OF A SCANNING MACHINE

BACKGROUND OF THE INVENTION

The present invention relates to a window arrangement of a scanner, and more particularly to the arrangement of a window on a sheet-feed style or handy scanner which permits the window to be conveniently detached from the scanner for cleaning.

A variety of image sensors have been developed for picking up image of document and converting it into corresponding electrical signal. These image sensors are commonly used in optical scanners. A regular sheet-feed style scanner generally comprises a window disposed at the scanning area through which scanning light passes onto document to be scanned. This window protects the image sensor (for example charge coupled device) from dust. Because the window is disposed on the outside over which document passes, it tends to be covered with dust, moisture, dirt, etc. However, because the window is fixedly secured in place, it cannot be conveniently removed from the scanner for cleaning. If to clean the inner of the scanner base, the scanner must be dismantled so that the inner side of the window can be cleaned. However, dismantling the scanner is not an easy job. Further, when cleaning the inside of the scanner, the internal mechanism of the scanner may be damaged. If to deliver the scanner to a repair center for maintenance, the maintenance cost is high.

SUMMARY OF THE INVENTION

The present invention has been accomplished to provide a window arrangement which eliminates the aforesaid problems. According to one aspect of the present invention, the window arrangement comprises a scanning area in a sheet-feed style scanner through which document is moved and scanned, a window mounted in the scanning area through which scanning light passes onto document to be scanned, and a locating device adapted to separably hold the window in the scanning area. Because the locating device separably holds the window in the scanning area, the window can be conveniently removed from the scanner for cleaning. According to another aspect of the present invention, the window arrangement comprises a pick-up device fastened to one end of the window. Through the pick-up device, the window can be conveniently pulled away from the locating device out of the scanning area by hand without the use of a tool.

DETAILED DESCRIPTION OF THE PREFER EMBODIMENTS

Figure 1:
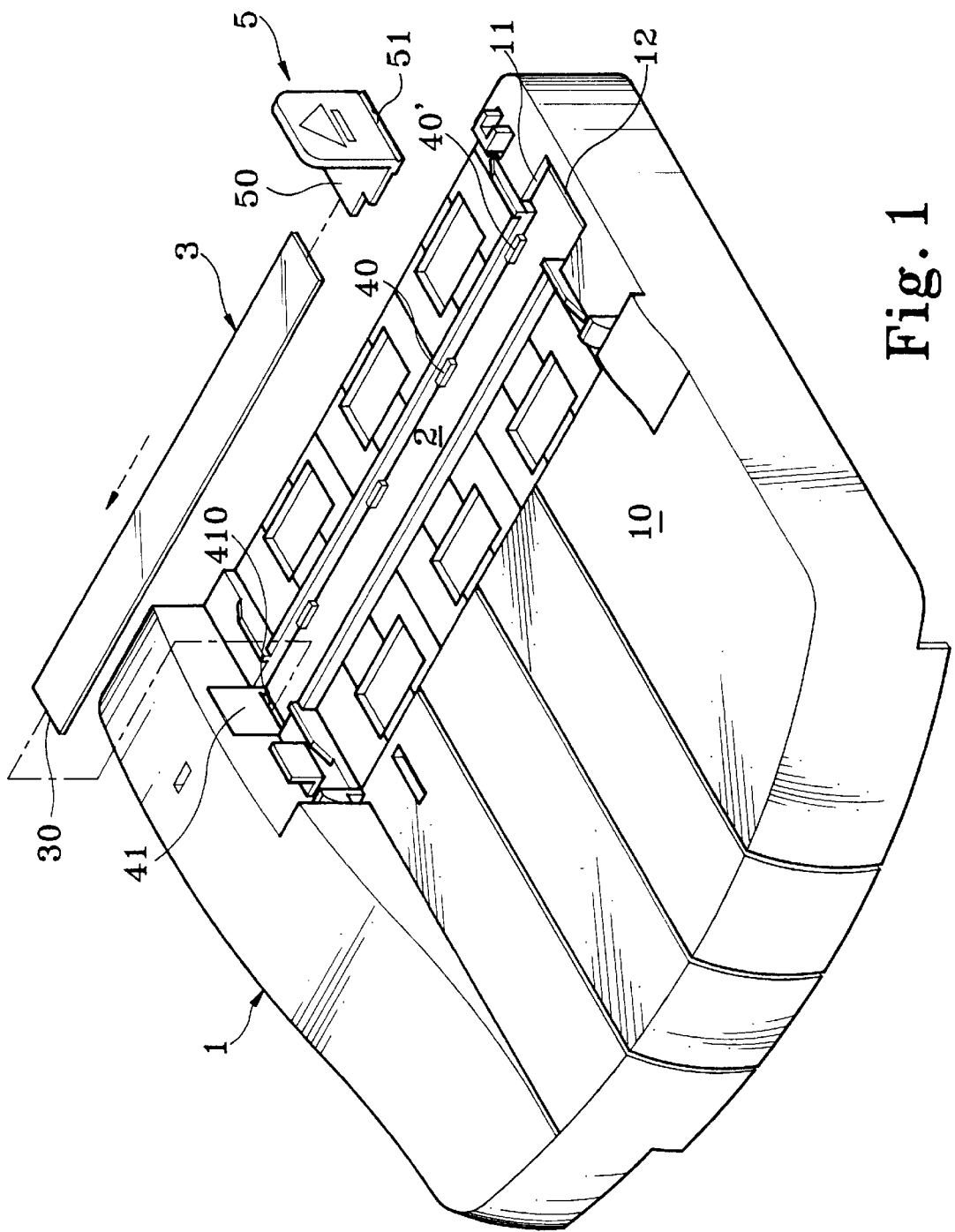
FIG. 1 is an exploded view of a sheet-feed style scanner, showing the structure of a window arrangement according to a first embodiment of the present invention.

Referring to FIG. 1, a scanner 1 is provided having a scanning area 2 through which document is moved and scanned, and a window 3 mounted in the scanning area 2 through which scanning light passes onto document. The window 3 can be made from glass, acrylic, or any suitable material that admits light, having a sheet-like shape of uniform thickness, having a document carrying surface disposed in flush with the document path 10 at a top side of the scanner 1. The scanning area 2 defines a recessed area 11. The window 3 is mounted in the recessed area 11 in a flush manner. The recessed area 11 is for example a through hole through which the scanning light passes onto document. A locating device is provided to detachably hold the window 3 in a position corresponding to the image sensor of the scanner 1. The locating device comprises a plurality of projecting portions 40;40' symmetrically raised from two opposite vertical lateral side walls of the recessed area 11 and adapted to hold the window 3 in flush with the document path 10, and a springy holding down device 41 adapted to hold down the window 3 in the recessed area 11. The springy holding down device 41 is a strip-like element raised from the shell of the scanner 1, having a stepped retaining portion 410 at its bottom side adapted to engage the front end 30 of the window 3. A pick-up device 5 is provided and coupled to the window 3 through which the user can conveniently remove the window 3 from the scanner 1. The pick-up device 5 comprises a coupling portion 50 coupled to the window 3, and a hooked portion 51 for engagement with a nose 12 at one end of the recessed area 11 remote from the springy holding down device 41. When the front end 30 of the window 3 is forced into engagement with the stepped retaining portion 410 of the springy holding down device 41, the springy holding down device 41 is forced to tilt backwards, permitting the hooked portion 51 of the pick-up device 5 to pass over the nose 12. When the hand is released from the pick-up device 5, the springy holding down device 41 immediately returns to its former shape to impart a pressure to the window 3 against the pick-up device 5, thereby causing the hooked portion 51 of the pick-up device 5 to be forced into engagement with the nose 12. When the pick-up device 5 is pushed forwards to move the window 3 against the springy holding down device 41, the hooked portion 51 can then be disengaged from the nose 12, for permitting the window 3 to be carried with the pick-up device 5 out of the recessed area 11 of the scanner 1.

Figure 2:
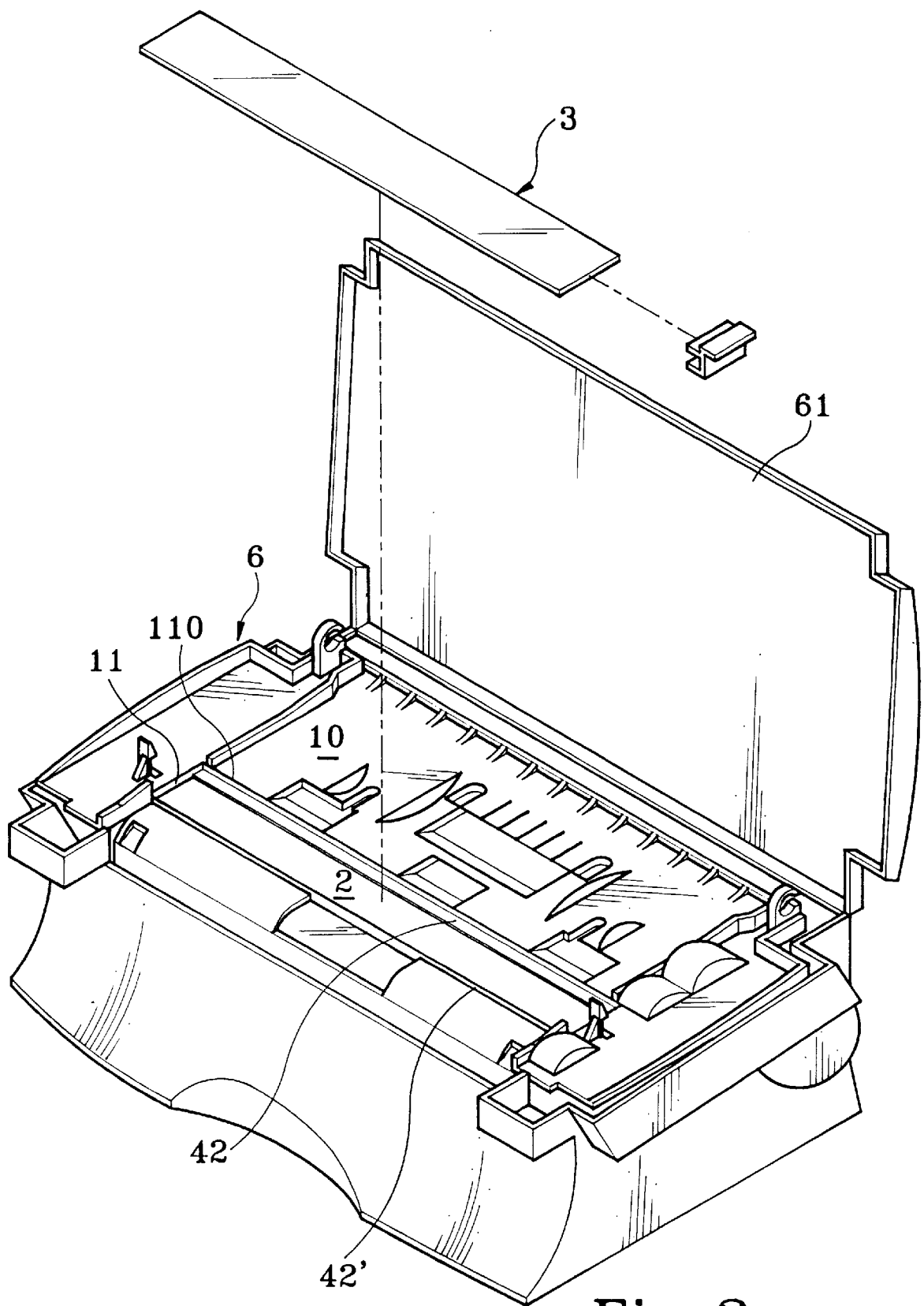
FIG. 2 is an exploded view of another sheet-feed style scanner, showing the structure of a window arrangement according to a second embodiment of the present invention.

FIG. 2 shows an alternate form of the present invention. According to this alternate form, the scanner 6 is a sheet-feed style scanner in which the locating device comprises two vertical side walls 110 at two opposite lateral sides of the recessed area 11, and two elongated ribs 42;42' respectively raised from the vertical side walls 110 at the bottom and facing each other. When the window 3 is carried on the elongated ribs 42;42' it is retained in place by the vertical side walls 110. Therefore, when the top cover 61 of the scanner 6 is closed, the window 3 does not fall out of the scanner 6.

Figure 3:
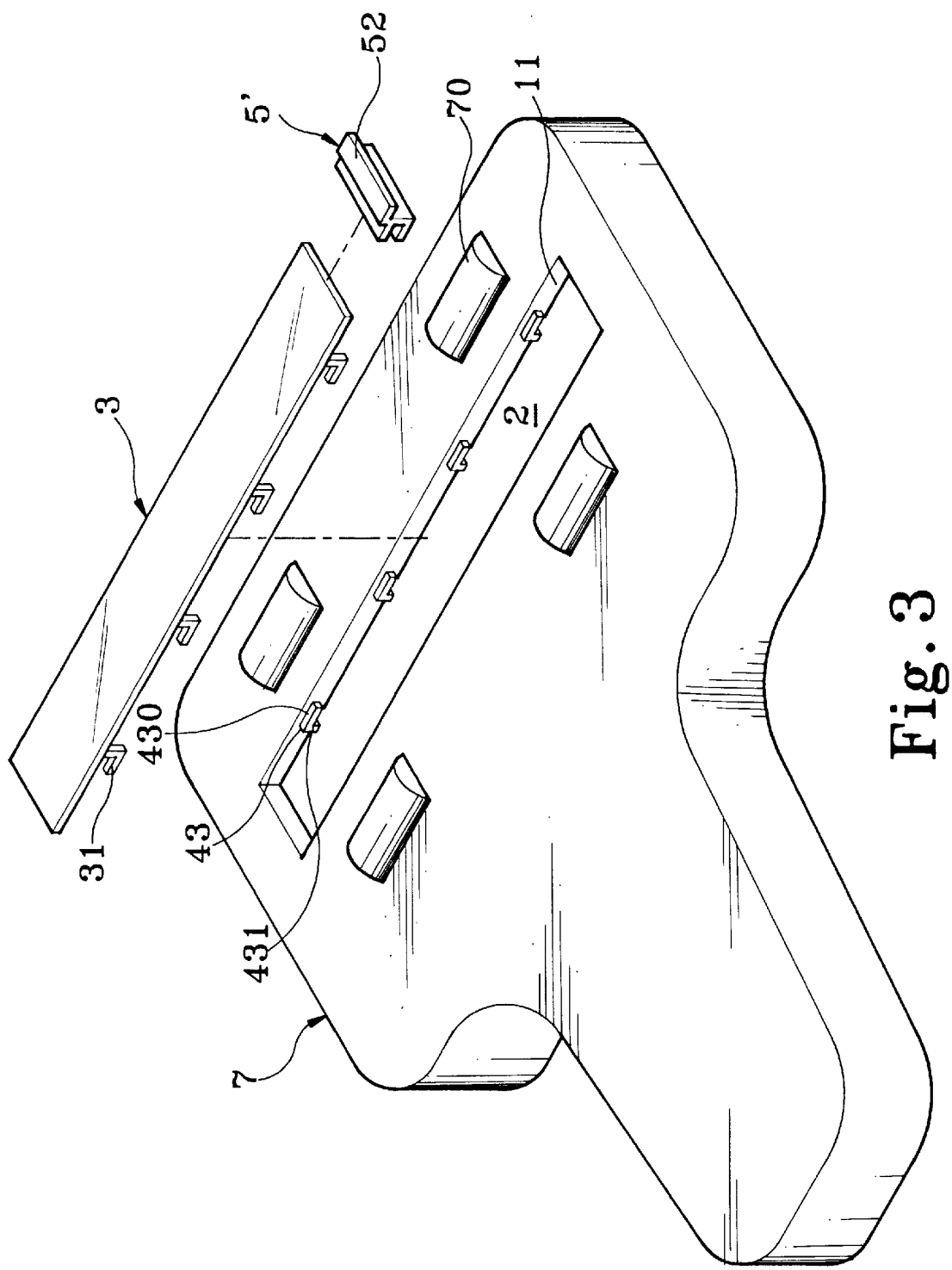
FIG. 3 is an exploded view of a handy scanner, showing the structure of a window arrangement according to a third embodiment of the present invention.

FIG. 3 shows another alternate form of the present invention. According to this alternate form, the scanner 7 is a handy scanner in which the locating device comprises a plurality of first hooks 43 symmetrically disposed at two opposite lateral sides of the recessed area 11, each first hook 43 having a horizontal portion 430 adapted for supporting the window 3 and a vertical portion 431, and a plurality of second hooks 31 symmetrically raised from the bottom side of the window 3 outside the scanning area for engagement with the first hooks 43; the pick-up device 5' is fixedly connected to one end of the window 3, having a finger strip 52 for the holding of the hand. The height of the finger strip 52 must not interfere with movement of the handy scanner 7. Through the finger strip 52, the pick-up device 5' can be pulled to disengage the window 3 from the first hooks 43.

Figure 4:
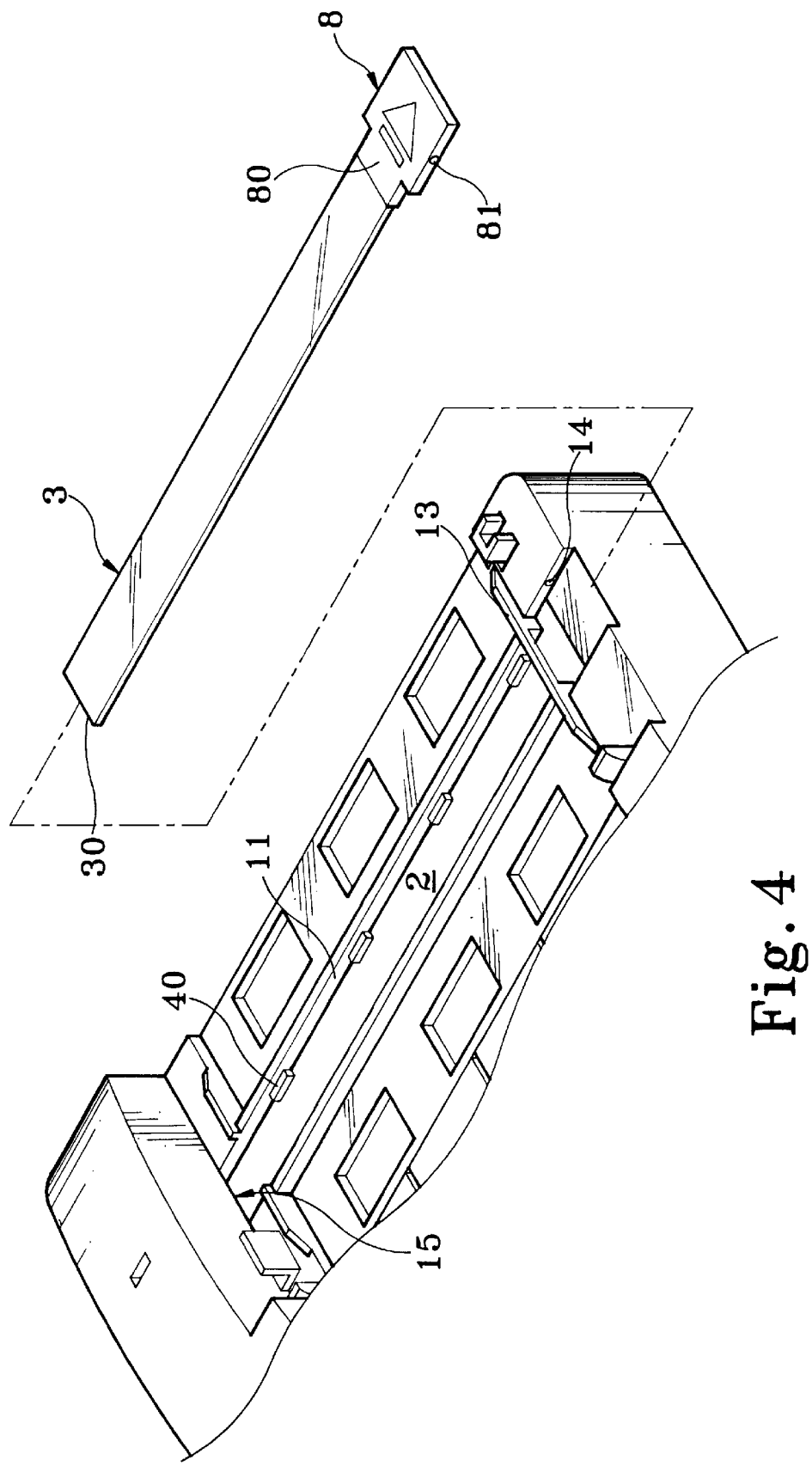
FIG. 4 is an exploded view of a part of a scanner, showing the structure of a window arrangement according to a fourth embodiment of the present invention.

FIG. 4 shows still another alternate form of the present invention. According to this alternate form, the pick-up device 8 is a flat plate having a coupling portion 80 coupled to one end of the window 3, and two raised portions 81 respectively raised from two opposite lateral sides thereof. When the front end 30 of the window 3 is inserted through a gap below a constraint bridge 13 and hold by portion of the scanner base 15 into coincidence with the scanning area 2, the raised portions 81 of the pick-up device 8 are forced into engagement with respective recessed portions 14 to hold the window 3 in place.

Figure 5:
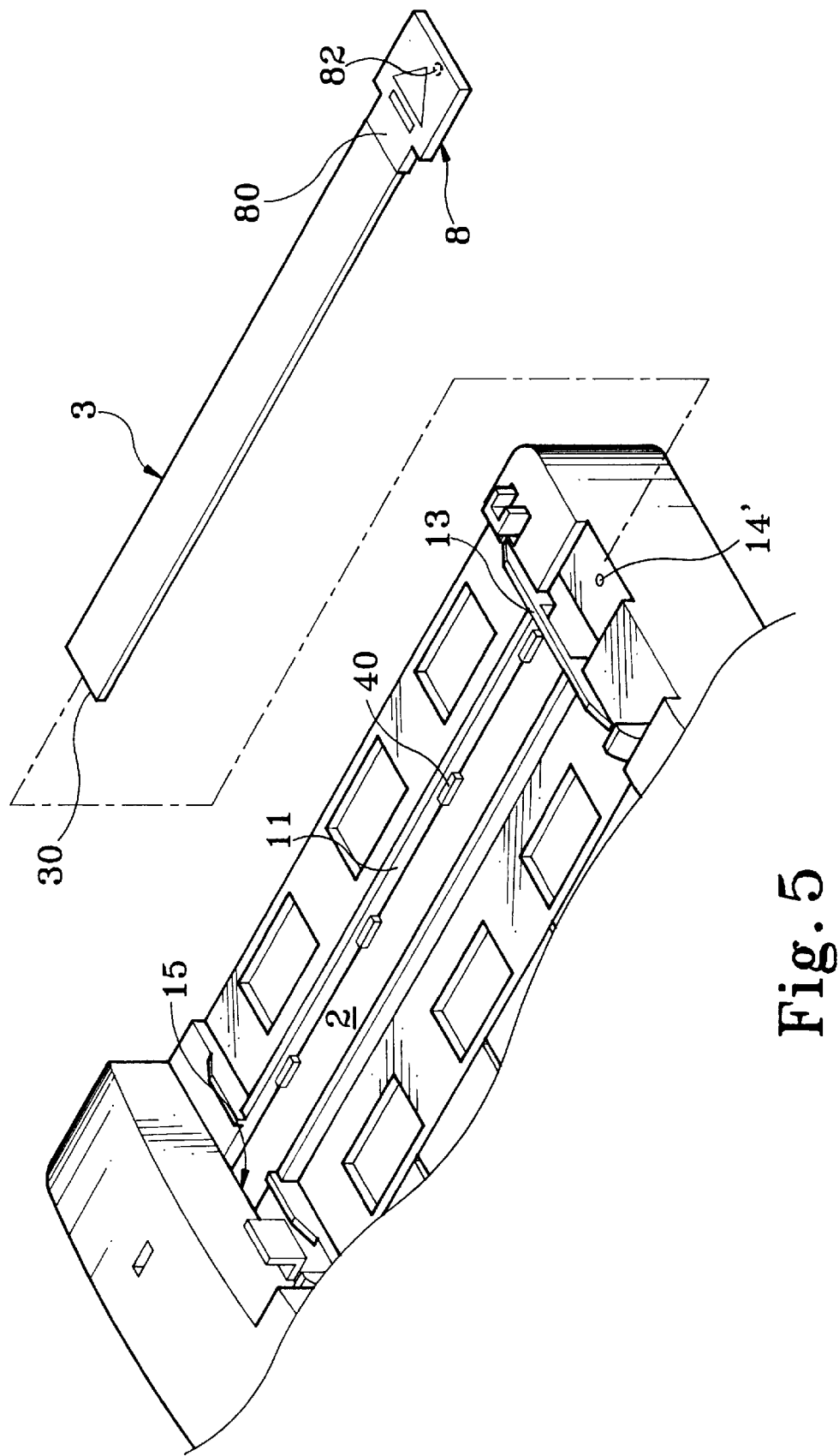
FIG. 5 is an exploded view of a part of a scanner, showing the structure of a window arrangement according to a fifth embodiment of the present invention.

FIG. 5 shows still another alternate form of the present invention. This alternate form is similar to the embodiment shown in FIG. 4, however the pick-up device 8 has only one raised portion 82 raised from its bottom side and adapted for engaging a corresponding recessed portion 14' on the scanner.

It is to be understood that the drawings are designed for purposes of illustration only, and are not intended as a definition of the limits and scope of the invention disclosed.

We claim:

1. A window arrangement of a scanning machine comprising:

a scanning area in a scanner through which a document is moved and scanned;

a window mounted in said scanning area through which scanning light passes onto document to be scanned;

a holding device adapted to hold said window in said scanning area; and a pick-up device fastened to one end of said window through which said window can be pulled away from said holding device and out of said scanning area for a maintenance work;

further wherein said scanning area comprises a recessed area which receives said window and admits light; and said holding device comprises a plurality of projecting portions symmetrically raised from two opposite vertical lateral side walls of said recessed area and adapted to hold said window in said scanning area, a springy down-holding device disposed at one end of said scanning area and adapted to hold down said window on said projecting portions in said scanning area and having a stepped retaining portion for engaging one end of said window, a hooked portion at one side edge of said pick-up device, and a nose disposed at one end of said recessed area remote from said down-holding device for engagement with said hooked portion.

2. A window arrangement of a scanning machine comprising:

a scanning area in a scanner through which a document is moved and scanned;

a window mounted in said scanning area through which scanning light passes onto document to be scanned;

a holding device adapted to hold said window in said scanning area; and a pick-up device fastened to one end of said window through which said window can be pulled away from said holding device and out of said scanning area for a maintenance work;

further wherein said scanning area comprises a recessed area which receives said window and admits light; and said holding device comprises a plurality of first hooks symmetrically disposed at two opposite lateral sides of said recessed area, each of said first hooks having a horizontal portion adapted for supporting said window and a vertical portion, and a plurality of second hooks symmetrically raised from a bottom side of said window for engagement with said first hooks.

3. A window arrangement of a scanning machine comprising:

a scanning area in a scanner through which a document is moved and scanned;

a window mounted in said scanning area through which scanning light passes onto document to be scanned;

a holding device adapted to hold said window in said scanning area; and a pick-up device fastened to one end of said window through which said window can be pulled away from said holding device and out of said scanning area for a maintenance work;

further wherein said scanning area comprises a recessed area which receives said window and admits light; and said holding device comprises a constant bridge bridging over one end of said recessed area through which said window is inserted into said recessed area, a plurality of raised portions raised from two opposite lateral sides of said pick-up device, and a plurality of recessed portions bilaterally disposed at one side of said recessed area for engagement with said raised portions.

4. A window arrangement of a scanning machine comprising:

a scanning area in a scanner through which a document is moved and scanned;

a window mounted in said scanning area through which scanning light passes onto document to be scanned;

a holding device adapted to hold said window in said scanning area; and a pick-up device fastened to one end of said window through which said window can be pulled away from said holding device and out of said scanning area for a maintenance work;

further wherein said scanning area comprises a recessed area which receives said window and admits light; and said holding device comprises a constraint bridge bridging over one end of said recessed area through which said window is inserted into said recessed area, a raised portion raised from a bottom side of said pick-up device, and a recessed portion disposed at one end of said recessed area for engagement with said raised portion.

* * * * *